United States Patent
Takuwa et al.

(10) Patent No.: US 7,472,308 B2
(45) Date of Patent: Dec. 30, 2008

(54) STORAGE SWITCH SYSTEM, STORAGE SWITCH METHOD, MANAGEMENT SERVER, MANAGEMENT METHOD, AND MANAGEMENT PROGRAM

(75) Inventors: Shinya Takuwa, Habikino (JP); Yoshifumi Takamoto, Kokubunji (JP); Kouji Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 11/385,745

(22) Filed: Mar. 22, 2006

(65) Prior Publication Data

US 2007/0174659 A1 Jul. 26, 2007

(30) Foreign Application Priority Data

Dec. 13, 2005 (JP) ............................. 2005-358520

(51) Int. Cl. *G06F 11/00* (2006.01)
(52) U.S. Cl. ............................. 714/13; 726/4
(58) Field of Classification Search ........................ None
See application file for complete search history.

(56) References Cited

U.S. PATENT DOCUMENTS

| | | | |
|---|---|---|---|
| 5,996,075 A * | 11/1999 | Matena | 726/10 |
| 6,654,745 B2 * | 11/2003 | Feldman | 707/9 |
| 7,000,121 B2 * | 2/2006 | Jarosz | 726/15 |
| 7,032,128 B2 * | 4/2006 | Nakano | 714/11 |
| 7,240,234 B2 * | 7/2007 | Morita et al. | 714/4 |
| 7,266,715 B1 * | 9/2007 | Bazzinotti et al. | 714/4 |
| 2003/0018927 A1 * | 1/2003 | Gadir et al. | 714/4 |
| 2003/0101239 A1 | 5/2003 | Ishizaki | |
| 2004/0153711 A1 * | 8/2004 | Brunelle et al. | 714/4 |
| 2005/0097394 A1 * | 5/2005 | Wang et al. | 714/11 |

FOREIGN PATENT DOCUMENTS

JP 2003-204348 7/2003

* cited by examiner

*Primary Examiner*—Gabriel L Chu
(74) *Attorney, Agent, or Firm*—Antonelli, Terry, Stout & Kraus, LLP.

(57) ABSTRACT

When a failure is detected in a server currently being used, a management server changes the network topology for the server currently being used and another server which substitutes the server. Then, the management server instructs the network SW with the changed network topology so as to cause the network SW to set the network topology logically. In addition, the management server instructs a disk array unit to control accesses from the other server to the disk in accordance with the server where the failure is detected.

15 Claims, 16 Drawing Sheets

FIG.5

301 SERVER MANAGEMENT TABLE

| SERVER IDENTIFIER | PROCESSOR TYPE | MEMORY CAPACITY | BOOT DISK | VLAN ID | IP ADDRESS | STATUS |
|---|---|---|---|---|---|---|
| SERVER1 | CPU1 | 1GB | LU1 | VLAN1 | IP1 | OPERATION |
| SERVER2 | CPU1 | 1GB | LU2 | VLAN3 | IP2 | STOP |
| SERVER3 | CPU2 | 2GB | LU1 | VLAN2 | IP3 | OPERATION |
| SERVER4 | CPU1 | 2GB | - | DEFAULT VLAN | - | RESERVE |
| SERVER5 | CPU2 | 2GB | - | DEFAULT VLAN | - | FAILURE |

307 NETWORK MANAGEMENT TABLE

| SERVER IDENTIFIER | SW IDENTIFIER | PORT NUMBER | VLAN ID | tag VLAN |
|---|---|---|---|---|
| SERVER1 | SW1 | 1 | VLAN1 | × |
| SERVER2 | SW1 | 2 | VLAN3 | × |
| SERVER3 | SW1 | 3 | VLAN2 | × |
| SERVER4 | SW1 | 4 | DEFAULT VLAN | × |
| MANAGEMENT SERVER | SW1 | 5 | VLAN1,VLAN2,VLAN3 | ○ |

411 / 412 / 413 / 414 / 415

US 7,472,308 B2

STORAGE SWITCH SYSTEM, STORAGE SWITCH METHOD, MANAGEMENT SERVER, MANAGEMENT METHOD, AND MANAGEMENT PROGRAM

CROSS REFERENCE TO RELATED APPLICATIONS

This application claims the foreign priority benefit under Title 35, United States Code, §119(a)-(d) of Japanese Patent Application No. 2005-358520, filed on Dec. 13, 2005 in the Japan Patent Office, the disclosure of which is herein incorporated by reference in its entirety.

BACKGROUND OF THE INVENTION

1. Field of the Invention

The present invention relates to technologies which assure data security of storage units connected by a network.

2. Description of the Related Art

In recent years, technologies to boot a computer using a network boot method have being established. For instance, there are network boot methods which employ PXE (Preboot eXecution Environment), EtherBoot, and iBoot. However, in the methods, there are security problems since bootfiles are allowed to be shared. In other words, a computer may use a bootfile which the computer is not actually authorized to use, to execute a network boot. Furthermore, an unexpected computer may use a bootfile to execute a network boot and access information which the computer is not actually authorized to access.

Therefore, there has been disclosed a conventional method to switch storage units which are accessed by computers, using VLAN (Virtual LAN) technology (for instance, see U.S. patent application publication No. 2003/0101239 A1). VLAN technology is a technology to set virtual network segments. And, VLAN technology can logically change a network topology with being independent of a physical network topology of network devices. VLAN technology does not allow even devices which are connected to adjacent ports of a same network device, to communicate each other, when settings of network segments of the devices are different.

Such a switching method can prevent a storage unit from being accessed by a computer which actually has no access right to the storage unit. Consequently, it is possible to improve data security for the storage unit. In other words, it is possible to provide a secure IP protocol storage device.

SUMMARY OF THE INVENTION

However, in the method in U.S. patent application publication No. U.S. 2003/0101239 A1, there is a problem that, in the event of a failure in a computer, the computer cannot be switched to another computer while assuring data security of storage units which the computer is authorized to access.

In view of the above, it is an object of the present invention to switch a computer in a secure manner even in the event of a failure in the computer.

To solve the above-mentioned problem, in one aspect of the present invention, there is provided a storage switch system including a storage unit, a switch which logically sets a network topology between the storage unit and a plurality of computers, and a management server which communicates with the switch and the storage unit. In addition, the storage unit includes one or more disks and a controller which controls accesses to the disks corresponding to the computers. Moreover, the management server includes a memory and a processor. Thus, the memory holds the network topology which is set by the switch. Additionally, when a failure is detected in one of the computers currently being used, the processor of the management server refers to the memory to change the network topology for the computer where the failure is detected and another computer which substitutes the computer where the failure is detected. Then, the processor of the management server instructs the switch with the changed network topology so as to cause the switch to logically set the changed network topology. Furthermore, the controller of the storage unit controls accesses from the another computer to the disks in accordance with the computer where the failure is detected.

BRIEF DESCRIPTION OF THE DRAWINGS

FIG. 5 is a diagram which shows a configuration example of a server management table in FIG. 3.

FIG. 6 is a diagram which shows a configuration example of a network management table in FIG. 4.

DESCRIPTION OF THE PREFERRED EMBODIMENTS

Figure 1:
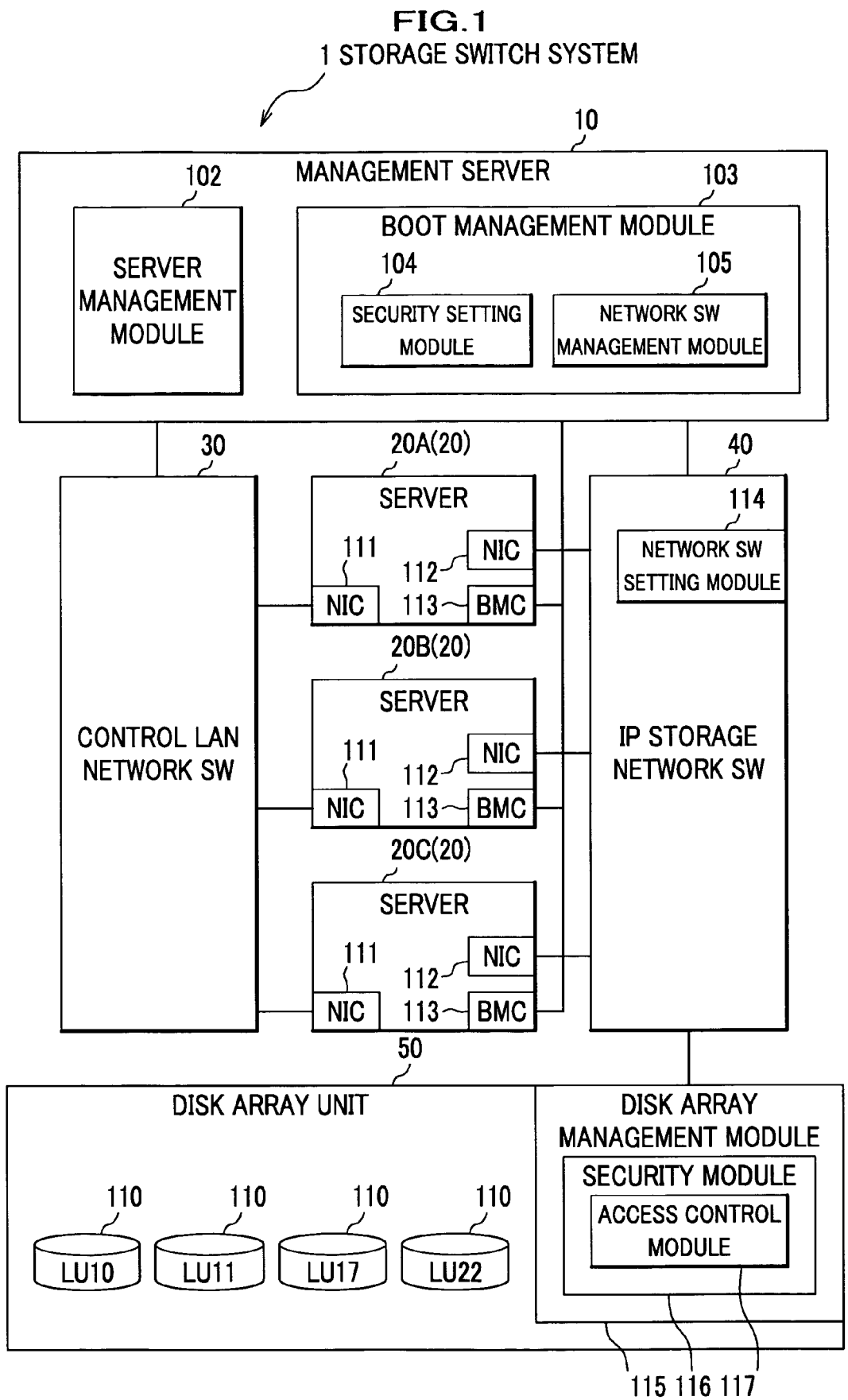
FIG. 1 is a diagram which shows a configuration example of a storage switch system according to an embodiment of the present invention.

FIG. 1 is a diagram which shows a configuration example of a storage switch system 1 according to an embodiment of the present invention. The storage switch system 1 includes a management server 10, a plurality of servers (computers) 20A, 20B, 20C, (each of the servers is also referred as a server 20), a control LAN network SW (a switch) 30, an IP storage network SW (a switch) 40, and a disk array unit (also referred as a storage unit) 50. Though only one disk array unit 50 is shown in FIG. 1, a plurality of disk array units 50 may be connected to the IP storage network SW 40.

The management server 10 is a computer which has management functions to switch the storage unit, for which the disk array unit 50 is implemented here. The management server 10 includes a server management module 102 which manages the server 20 and a boot management module 103 which manages a network boot using the storage unit. The boot management module 103 includes a security setting module 104 and a network SW management module 105, which will be described later. Meanwhile, the server management module 102 and the boot management module 103 are operated by a processor which is included in the management server 10 in accordance with management programs held in a memory which is also included in the management server 10. By the way, the management program may be loaded from a computer readable recording medium such as a CD-ROM.

The server 20A, 20B, and 20 C are computers on which users run application programs and so on, and have network boot functions. Each of the servers 20A, 20B, and 20C has network interface cards (also referred as NIC) 111 and 112.

The NIC 111 is an NIC through which each of the servers 20A, 20B, and 20C is connected to the control LAN. The NIC 111 only needs to have functions to support a common network protocol such as TCP/IP on Ethernet (a registered trademark), for instance. On the other hand, the NIC 112 has boot functions to perform a network boot besides the functions to support the common network protocol.

Moreover, each of the servers 20A, 20B, and 20C has functions of a BMC (Baseboard Management Controller) 113 to detect a failure. When the server 20A, 20B, or 20C malfunctions, a failure in the server is notified to the management server 10 by the functions.

Both of the control LAN network SW 30 and the IP storage network SW 40 have functions to switch the network. The control LAN network SW 30 only needs to support the common network protocol described above.

On the other hand, the IP storage network SW 40 has a network SW setting module 114 to support VLAN (Virtual LAN) besides the common network protocol. The network SW setting module 114 has functions to set a network (a network topology) such as VLAN. By means of the functions, the IP storage network SW 40 limits accesses to the disk array unit 50 which the server 20 can perform, so as to assure security.

The disk array unit 50 includes a plurality of physical disk drives (disks) 110 and a disk array management module (a controller) 115. In the present embodiment, the physical disk drives 110 can be accessed also as logical disk drives (also referred as virtual disks), which are not shown, by management functions of the disk array management module 115. However, the present invention is not limited to this. For instance, the disk array unit 50 may directly access the physical disk drives 110.

The disk array management module 115, which configures a disk array including a plurality of the physical disk drives 110, has logical disks formed of one or more physical disks. The logical disk means each of segments into which a RAID (Redundant Arrays of Independent Disks) group is logically divided, for instance.

The disk array management module 115 includes the security module 116 which includes the access control module 117. The security module 116 controls accesses to the logical disks using the access control module 117. In such a configuration, even in the event of an unauthorized access or a wrong access to the logical disks, it is possible to refuse the access.

Figure 2:
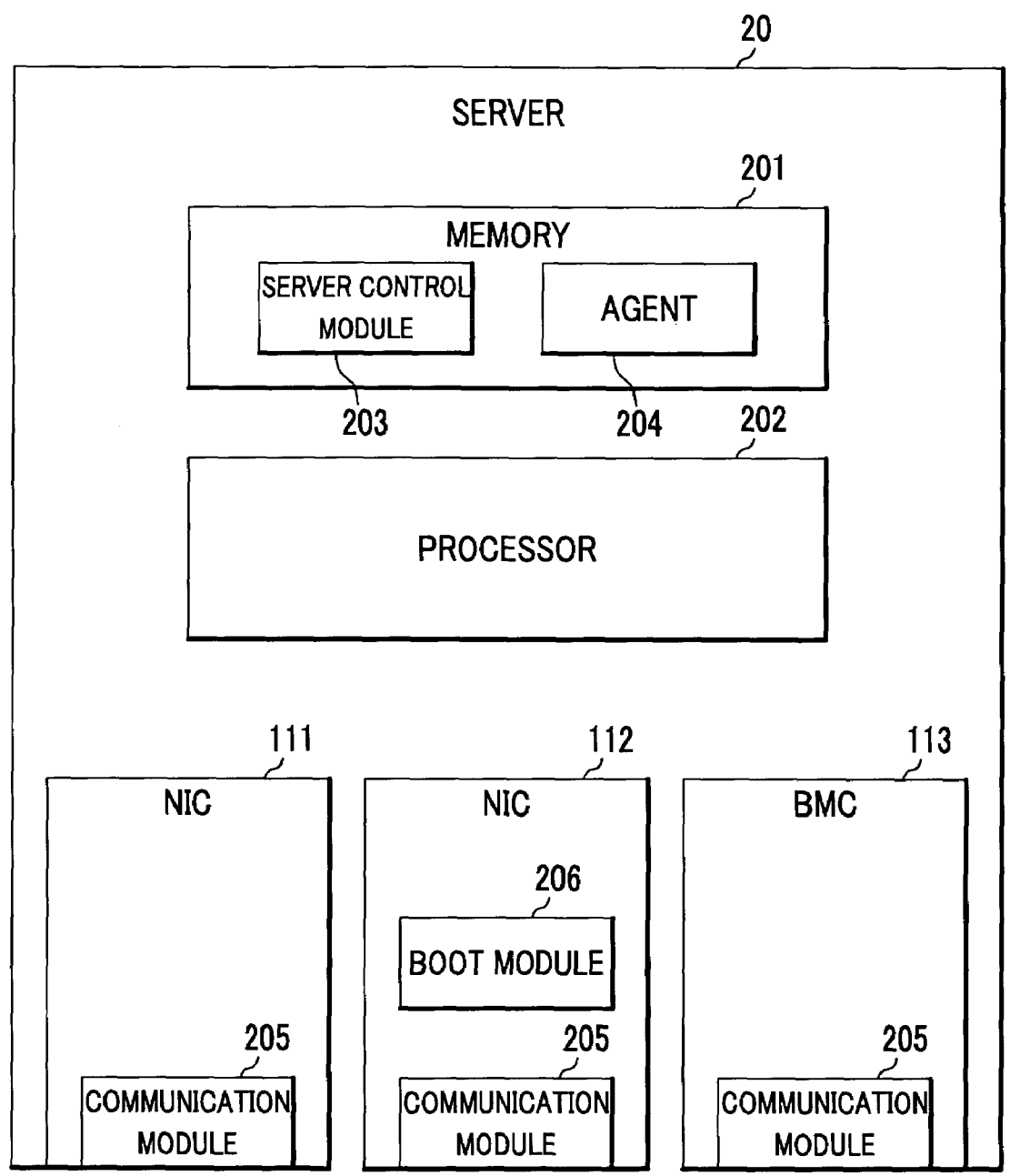
FIG. 2 is a diagram which shows a configuration example of a server in FIG. 1.

As shown in FIG. 2, the server 20 includes a memory 201, a processor 202, the NICs 111 and 112, and the BMC 113. The memory 201 merely needs to be a semiconductor memory which the processor 202 can use. Therefore, there are no special limitations on types and standards. Programs such as a server control module 203 and an agent 204 are held in the memory 201. Moreover, the programs are operated by the processor 202.

The server control module 203 controls operations of the server 20 in accordance with instructions from the server management module 102 in the management server 10. The agent 204 is a program which is sent from the boot management module 103 in the management server 10. And, the agent 204 communicates boot information with the management server 10 to control a boot operation of the server 20.

The processor 202 merely needs to be a processor which provides predetermined operational functions. Therefore, there are no special limitations on types and specifications.

The NIC 111 includes a communication module 205 which has communication functions to communicate using a common communication protocol such as TCP/IP, for instance. The NIC 112 includes a boot module 206 besides the communication functions of the communication module 205. The boot module 206 has functions to perform a network boot by means of PXE (Preboot eXecution Environment) method. Meanwhile, the network boot is not limited to the PXE method. The network boot may be executed by means of a method such as Etherboot or iboot.

The BMC113 includes the communication module 205. In the event of a failure in the server 20, the BMC113 notifies occurrence of the failure to the management server 10 using the communication module 205.

Next, referring to FIG. 3, a configuration example of the server management module 102 in the management server 10 will be described. In the present embodiment, the server management module 102 is provided in the management server 10. However, the server management module 102 may be provided in another computer other than the management server 10.

Figure 3:
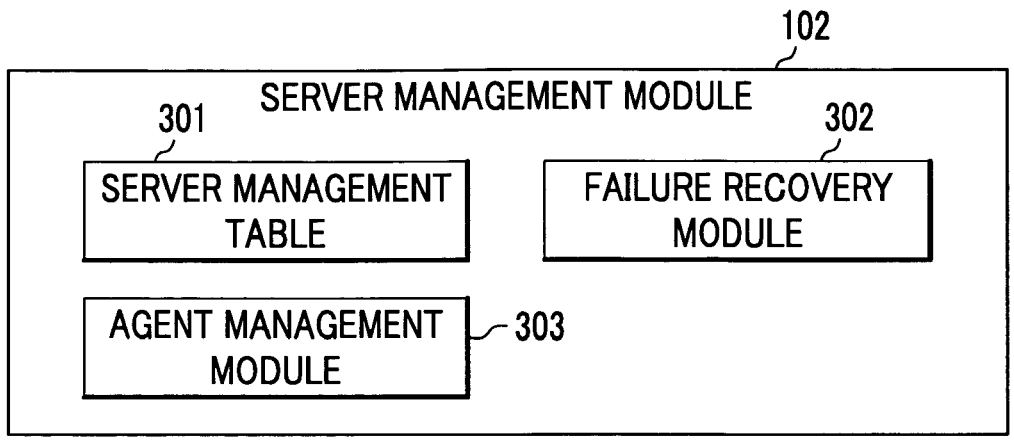
FIG. 3 is a diagram which shows a configuration example of a server management module in FIG. 1.

As shown in FIG. 3, the server management module 102 includes the server management table 301, the failure recovery module 302, and the agent management module 303. The server management table 301 is held in the memory in the management server 10. The server management table 301, which will be described in detail referring to FIG. 5 later, is a table with which operation statuses and so on of the servers are managed. The failure recovery module 302 receives a notification which indicates a failure from the BMC 113 and then recovers the server 20 from the failure. In the present embodiment, the failure recovery module 302 may reset the server 20, for instance.

Figure 4:
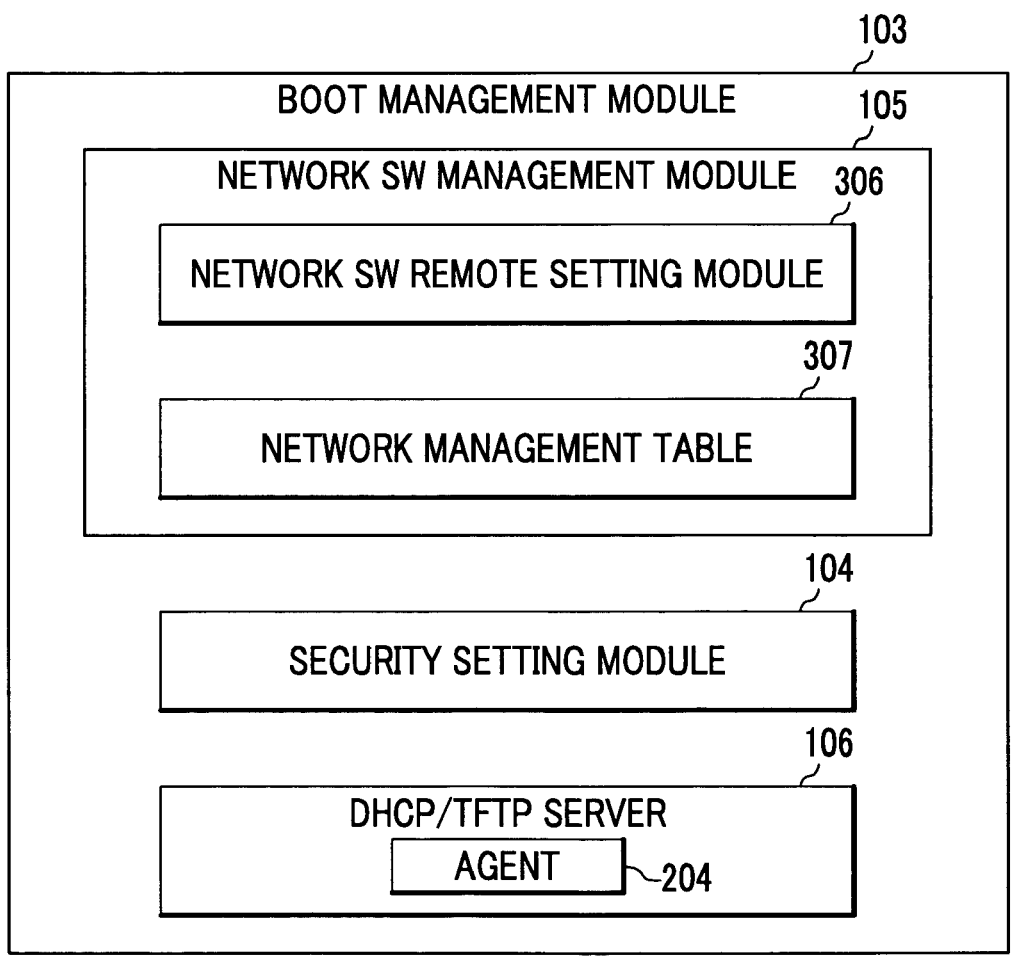
FIG. 4 is a diagram which shows a configuration example of a boot management module in FIG. 1.

Next, referring to FIG. 4, a configuration example of the boot management module 103 in the management server 10 will be described. As shown in FIG. 4, the boot management module 103 includes the security setting module 104, the network SW management module 105, and a DHCP (Dynamic Host Configuration Protocol)/TFTP (TriVial File Transfer Protocol) server 106.

The network SW management module 105, which includes a network SW remote setting module 306 and a network management table 307, performs operations for setting and management of the network SW in the boot management. Here, the network management table 307 is held in the memory in the management server 10.

The network SW remote setting module 306 has functions to set a VLAN and so on for a network control LAN for the IP storage network SW 40.

Moreover, the network SW remote setting module 306, which calls the network SW setting module 114 of the IP storage network SW 40 thorough the network, has setting functions similar to the network SW setting module 114.

Which VLAN each of the servers 20 belongs to, and so on are managed by the network management table 307, which will be described in detail referring to FIG. 6 later.

The security setting module 104 calls the security module 116 (see FIG. 1) in the disk array unit 50 through the network in order to set items for security. For instance, contents of an access control table 118 (see FIG. 8) are set by an access control module 117 so that accesses to the disk array unit 50 can be limited.

The DHCP/TFTP server 106 has functions equivalent to a well-known DHCP server and a TFTP server which are provided in a computer or the like where UNIX (a registered trademark) operates. DHCP and TFTP are respectively abbreviations of Dynamic Host Configuration Protocol and Trivial File Transfer Protocol.

The DHCP server has a function to assign an IP address to be used for a client computer in response to a request from the client computer. The TFTP server has a function to send a file which is requested to perform the network boot without requiring a username or a password authorization. Here, the TFTP server may respond to only requests from pre-registered IP addresses or respond to requests without checking IP addresses from which the requests are sent.

Moreover, the DHCP/TFTP server 106 distributes the agent 204 which is used by the server 20 to perform a boot.

Next, referring to FIG. 5, a configuration example of the server management table 301 (see FIG. 3) will be described in detail. As shown in FIG. 5, the server management table 301 includes items of a server identifier 401, a processor type 402, a memory capacity 403, a boot disk 404, a VLAN ID 405, an IP address 406, and a status 407. The server identifier 401 is information to identify the server 20 so as to uniquely identify each of the servers 20.

The processor type 402 is an item to indicate a type of the processor 202 which is provided in the server 20. For instance, processors which have a same value specified by the processor type 402 (for instance CPU1 or the like) can be booted from a same boot disk. Accordingly, it is possible to determine which boot disk each of the servers 20 can be booted from. However, even processors which have different values specified by the processor type 402 may be booted from a same boot disk depending on the type of the processor.

The memory capacity 403 is an item which indicates a capacity of the memory in the server 20. A server whose memory capacity 403 is equal or approximate to a server in operation is to be a candidate of a substitute for the server in operation.

The boot disk 404 is an item which indicates a disk number of a boot disk which is used by each of the servers. When the disk number of the boot disk is pre-determined, the disk number (for instance, LU1) is held for the item of the boot disk 404. Even when the disk number of the boot disk used for a network boot is pre-determined, using this item makes it possible to manage the disk number of the boot disk to perform the network boot with the server management table 301.

By the way, a disk number of either of a physical disk drive or a logical disk drive may be held for the item of the boot disk 404.

The VLAN ID 405 is an item which indicates an ID of VLAN which the server 20 can access. The ID of VLAN (for instance, VLAN1, etc.) is assigned to a server in a status of operation or stop, while a default VLAN is assigned to a server in a status of reserve or failure.

The IP address 406 is an item to hold an IP address assigned to the NIC 112 of the two NICs 111 and 112 provided in the server 20. The IP address is used to access the IP storage network. The IP address of the NIC 112 is assigned by the DHCP/TFTP server 204. Therefore, different IP addresses may be assigned even to the same server depending on situations.

The status 407 is an item which indicates a current status of the server 20. For instance, there are four statuses such as an operation, a stop, a reserve, and a failure as the status of the server 20. Among the four statuses, the operation indicates a status where the server 20 is in normal operation and ready to be used.

The stop indicates a normal status where the server 20 is in stop. When a system administrator executes a boot process of the server 20 in this status, the server 20 starts operating. Then, the status will be changed from the stop to the operation.

The reserve indicates a status where the server 20 is normally waiting. When the status of the server 20 is the reserve, the system administrator cannot immediately execute the boot process for the server 20 with the status as it is unlike in the case of the status of the stop. Therefore, the status cannot be directly changed from the reserve to the operation. It is because that the same values with the server where a failure has occurred need to be set for the items of the boot disk 404 and the VLAN ID 405 in the server management table 301 (see FIG. 5) for the server 20 which has the status of the reserve before the status is changed from the reserve to the operation.

The failure indicates a status where there is a failure in the server 20. High temperature or the like in a processor is one of examples of failures. In the present embodiment, the two statuses of the reserve and the failure are differently managed since a server with the status of the failure cannot be a reserve server.

Next, referring to FIG. 6, a configuration example of the network management table 307 (see FIG. 4) will be described in detail. As shown in FIG. 6, the network management table 307 includes items of a server identifier (an identifier of the computer) 411, an SW identifier (an identifier of the switch) 412, a port number (a port number of the switch) 413, a VLAN ID (identifying information of the network) 414, and a tag VLAN 415. The server identifier 411 is information to identify the server 20. Additionally, the SW identifier 412 is information to identify the IP storage network SW 40. Thus, the network management table 307 is used to manage a network topology which includes the management server 10, the server 20, and the IP storage network SW 40.

The port number 413 is an item to hold which port of the IP storage network SW 40 (a network port) the server 20 is connected to. The VLAN ID 414 is an item to hold an ID of a VLAN to which each of the servers 20 belongs. The number of IDs of VLANs to which the server 20 belongs is not always one.

The tag VLAN 415 is an item to indicate whether the management server 10 or the server 20 supports tag VLAN. In this item, "o" is set in a case of tag VLAN which supports functions to process multiple VLANs in parallel. On the other hand, "x" is set in a case where no such function is supported. In the present embodiment, only the management server 10 supports tag VLAN. However, when the disk array unit 50 is shared and accessed by multiple servers 20, the disk array unit 50 needs to support tag VLAN. In addition, the server 20 may support tag VLAN.

Next, referring to FIG. 7, a setting example of the IP storage network SW 40 will be described. In the setting example, the IP storage network SW 40 has functions to set the VLANs by the network SW remote setting module 306 of the network SW management module 105. To set the VLANs, the network SW remote setting module 306 refers to the network management table 307 (see FIG. 6). And then, the network SW remote setting module 306 sets the VLANs in accordance with values set for the SW identifier 412, the port number 413, and the VLAN ID 414. Every time when contents of the network management table 307 are updated, such setting is performed.

Figure 7:
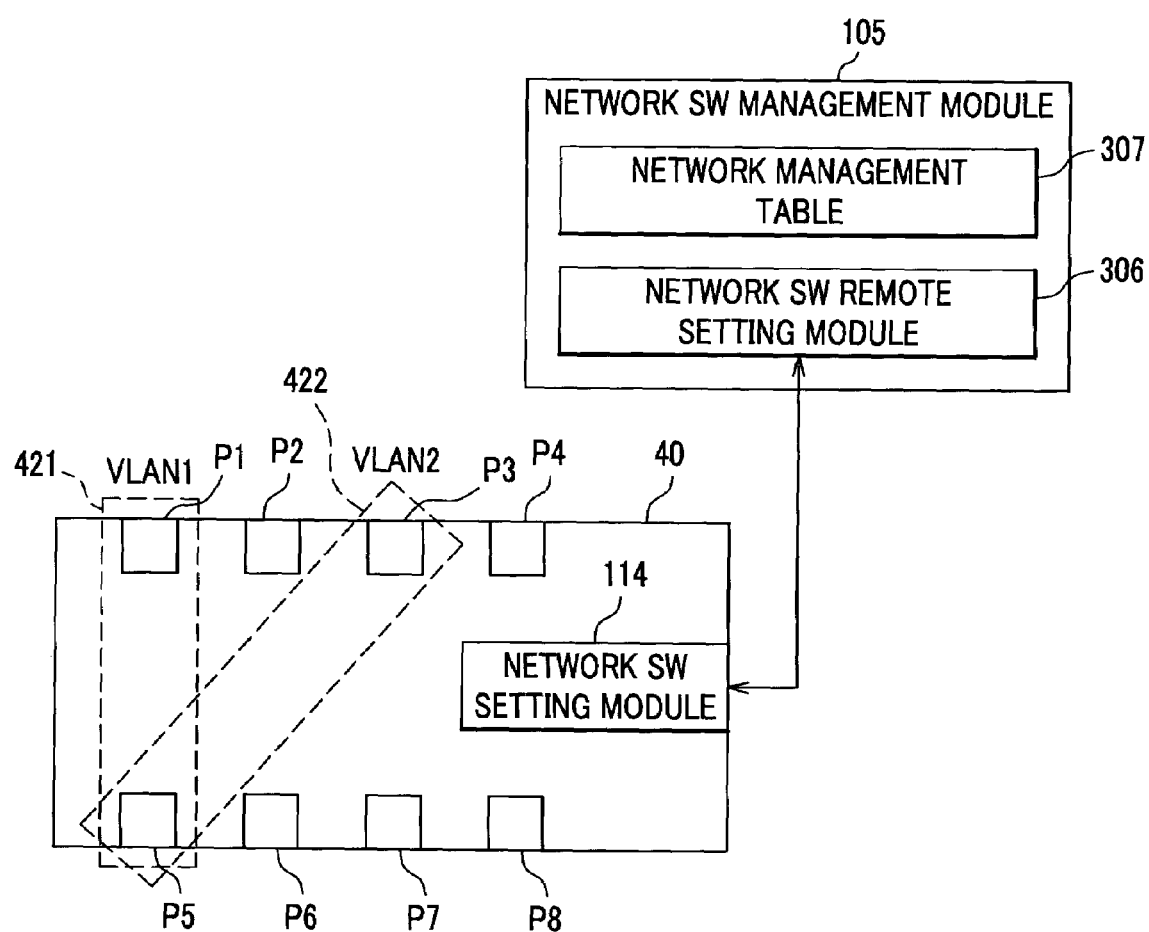
FIG. 7 is a diagram which shows a setting example of an IP storage network SW.

As shown in FIG. 7, in a concrete example, a Port P5 is connected to the management server 10; a port P1 is connected to the server 20A; and a port P3 is connected to the server 20C. In addition, VLAN1 and VLAN2 are respectively set for the port P1 and the port P3 of the IP storage network SW 40. Moreover, VLAN1, VLAN2, and VLAN3 are set for the port P5 to which the management server 10 is connected. Thus, VLAN1 and VLAN2 are set as shown in FIG. 7.

In this case, in the network management table 307 in FIG. 6, the identifier (Server1) of the server 20A corresponds to VLAN1, and the identifier (Server3) of the server 20C corresponds to VLAN 2. Additionally, a correspondence between the port number (1) of the port P1 and VLAN1 and a correspondence between the port number (3) of the port P3 and VLAN2 are held as relationship between the port number 413 and the VLAN ID 414. Furthermore, a correspondence between the port number (5) of the port P5 and VLAN1, VLAN2, and VLAN3 is held.

Figure 8:
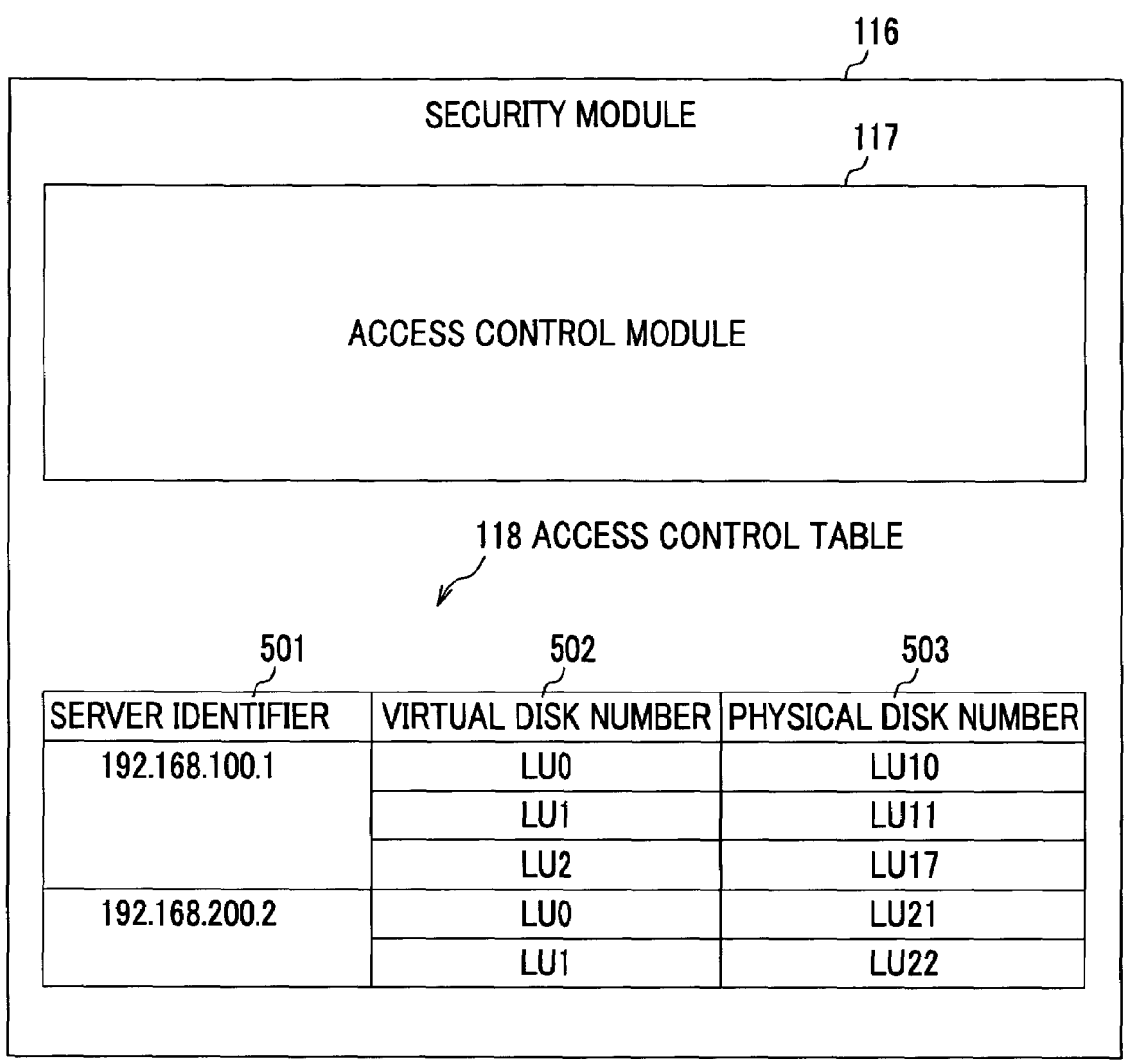
FIG. 8 is a diagram which shows a configuration example of a security module in FIG. 1.

Next, referring to FIG. 8, a configuration example of the security module 116 (see FIG. 1) will be described. In this configuration example, the security module 116 includes the access control module 117 and the access control table 118. The access control table 118 is held in a memory provided in the disk array unit 50. The access control module 117 refers to the access control table 118 to determine whether the access from the server 20 is authorized one. Thus, the access is refused if the access is not authorized one.

Which disk drive the server 20 accesses is managed using the access control table 118. More specifically, the access control table 118 includes items of a server identifier 501, a virtual disk number 502, and a physical disk number 503.

An IP address of the server 20 is held for the server identifier 501 as an identifier of the server. When the IP address of the server 20 is held as the identifier of the server, the access control module 117 can control accesses to the virtual disk drives based on the identifier.

By the way, the IP address of the server 20 may be assigned to multiple segments.

The items of the virtual disk number 502 and the physical disk number 503 are used to manage correspondences between virtual disks and physical disks for accesses from the server 20. A value specified by the virtual disk number 502 is a disk number of the virtual disk which the server is authorized to access. In the disk array unit 50, there is no physical disk drive 110 which corresponds to this disk number. On the other hand, all values specified by the physical disk numbers 503 correspond to the physical disk drives 110 in the disk array unit 50.

The values specified by the server identifier 501, the virtual disk number 502, and the physical disk number 503 are used to set correspondences between the disk numbers of the virtual disks which each of the servers 20 can access and the physical disk drives 110 which actually exist in the disk array unit 50.

For instance, when the server 20 is set to be booted only from LU0, the server 20 cannot be network booted as long as there is no LU0 among the physical disk numbers. However, the access control module 117 uses the correspondence specified by the items of the virtual disk number 502 and the physical disk number 503 in order to convert the virtual disk number 502 to the physical disk number 503 so that the physical disk drive 110 can be accessed. Therefore, the server 20 can be booted even if there is actually no physical disk drive corresponding to the virtual disk number.

Figure 9:
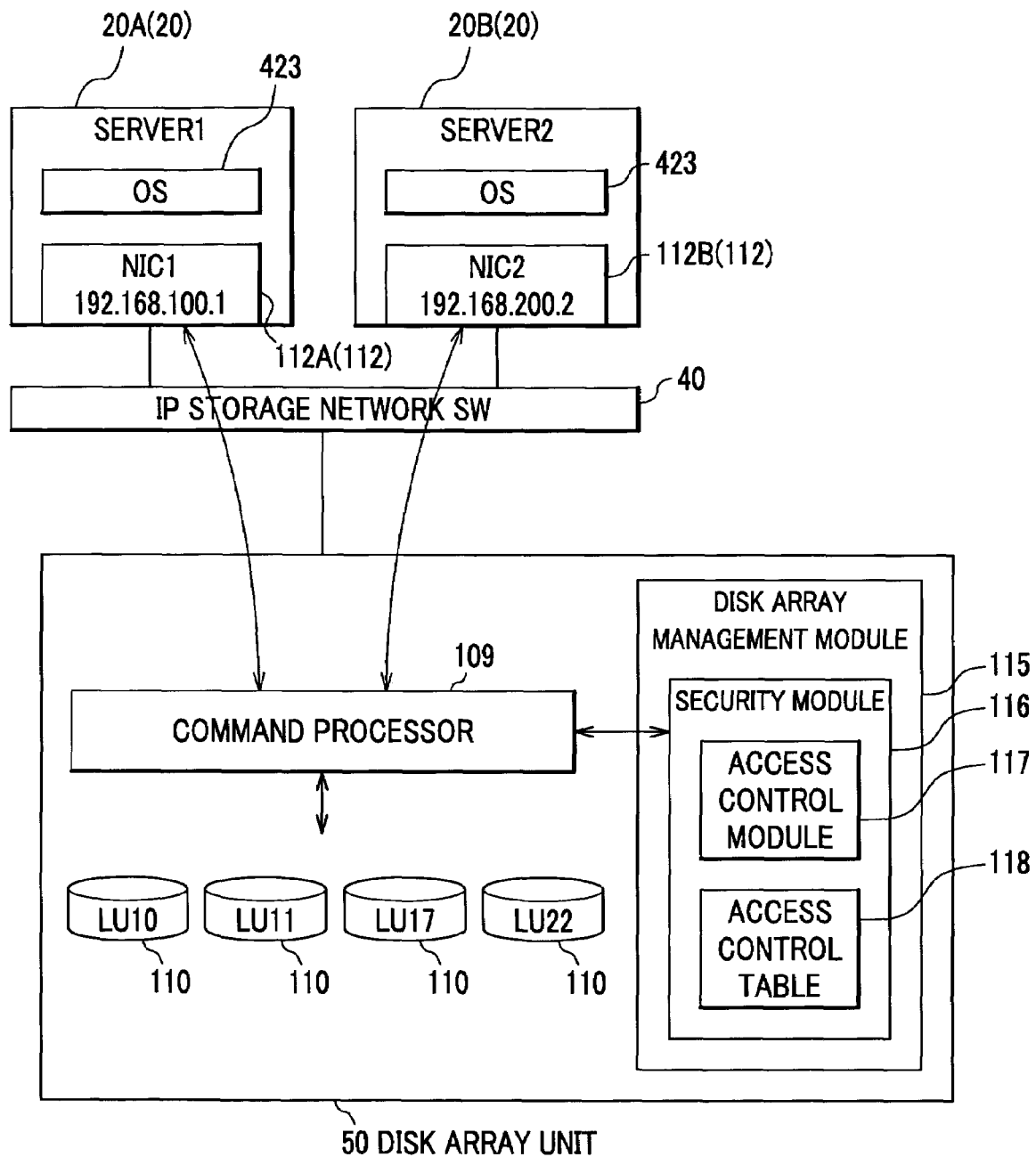
FIG. 9 is a diagram which shows how the server accesses a disk array unit.

Next, referring to FIG. 9, how the server 20 accesses the disk array unit 50 will be described. As shown in FIG. 9, the servers 20A and 20B access a command processor 109 in the disk array unit 50 through the IP storage network SW 40. The command processor 109 processes commands of iSCSI (Internet Small Computer System Interface), for instance, and reads and writes data from and to the physical disk drive 110.

Moreover, the command processor 109 sends information about the access from the server 20, to the security module 116. As described above, in the security module 116, the access control module 117 refers to the access control table 118 to determine whether the access from the server 20 is authorized one. Thus, the access is refused if the access is not authorized one.

Figure 10:
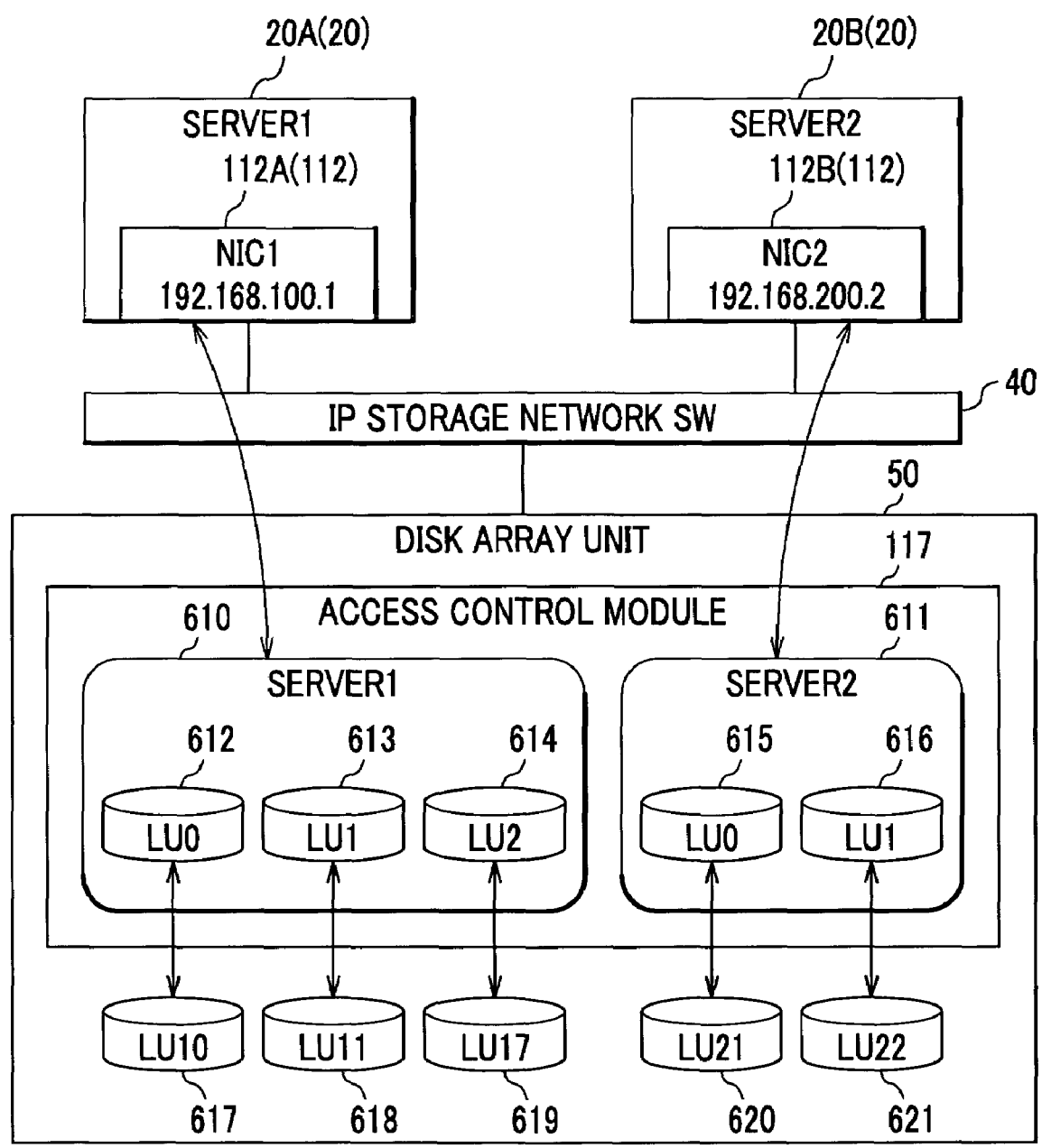
FIG. 10 is a diagram which shows how a plurality of servers uses physical disk drives in the disk array unit.

Next, referring to FIG. 10, how multiple servers 20 use the physical disk drives 110 in the disk array unit 50 will be described. In FIG. 10, Server1 (referred as the server 20A hereafter) and Server2 (referred as the server 20B hereafter) belong to different network segments, that is, different VLANs so as not to directly communicate each other in the IP storage network.

Server1 and Server2 access the disk array unit 50 through the IP storage network SW 40. In such a case, for instance, when Server1 accesses a virtual disk drive 610 which corresponds to logical disk drives 612, 613, and 614 whose virtual disk numbers are respectively LU0, LU1, and LU2, the access control module 117 converts the virtual disk numbers to the physical disk numbers. Therefore, Server1 accesses physical disk drives 617, 618, and 619 whose physical disk numbers are respectively LU10, LU11, and LU17.

Similarly, Server2 accesses the disk array unit 50 through the IP storage network SW 40. In such a case, for instance, when Server2 accesses a virtual disk drive 611 which corresponds to logical disk drives 615 and 616 whose virtual disk numbers are respectively LU0 and LU1, the access control module 117 converts the virtual disk numbers to the physical disk numbers. Therefore, Server2 accesses physical disk drives 620 and 621 whose physical disk numbers are respectively LU21 and LU22.

Next, referring to FIGS. 11 and 12, an example of switching the server 20 in the event of a failure in the server 20A will be described.

Figure 11:
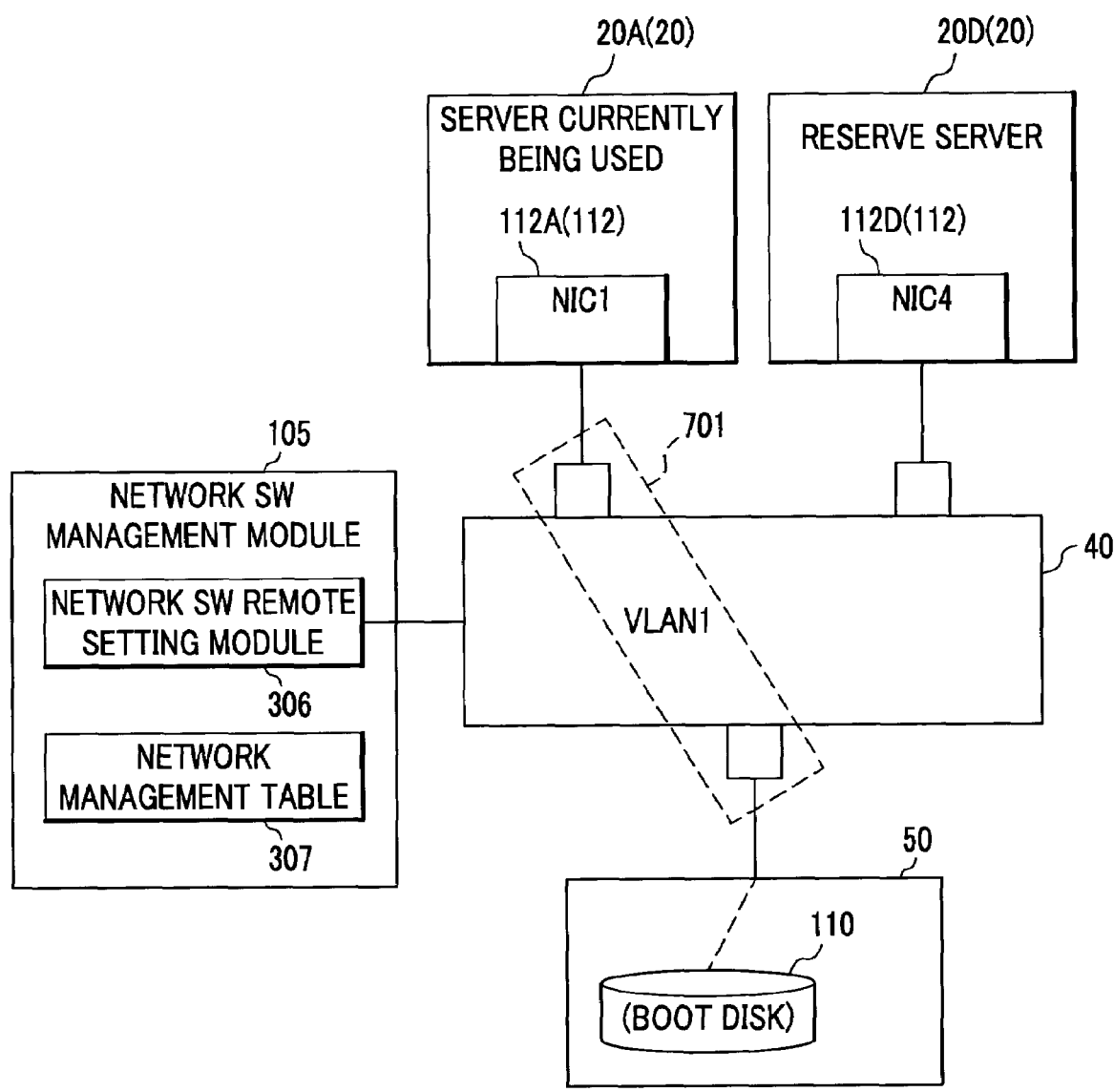
FIG. 11 is a diagram which shows an example of how the server is switched in the event of a failure in the server.
Figure 12:
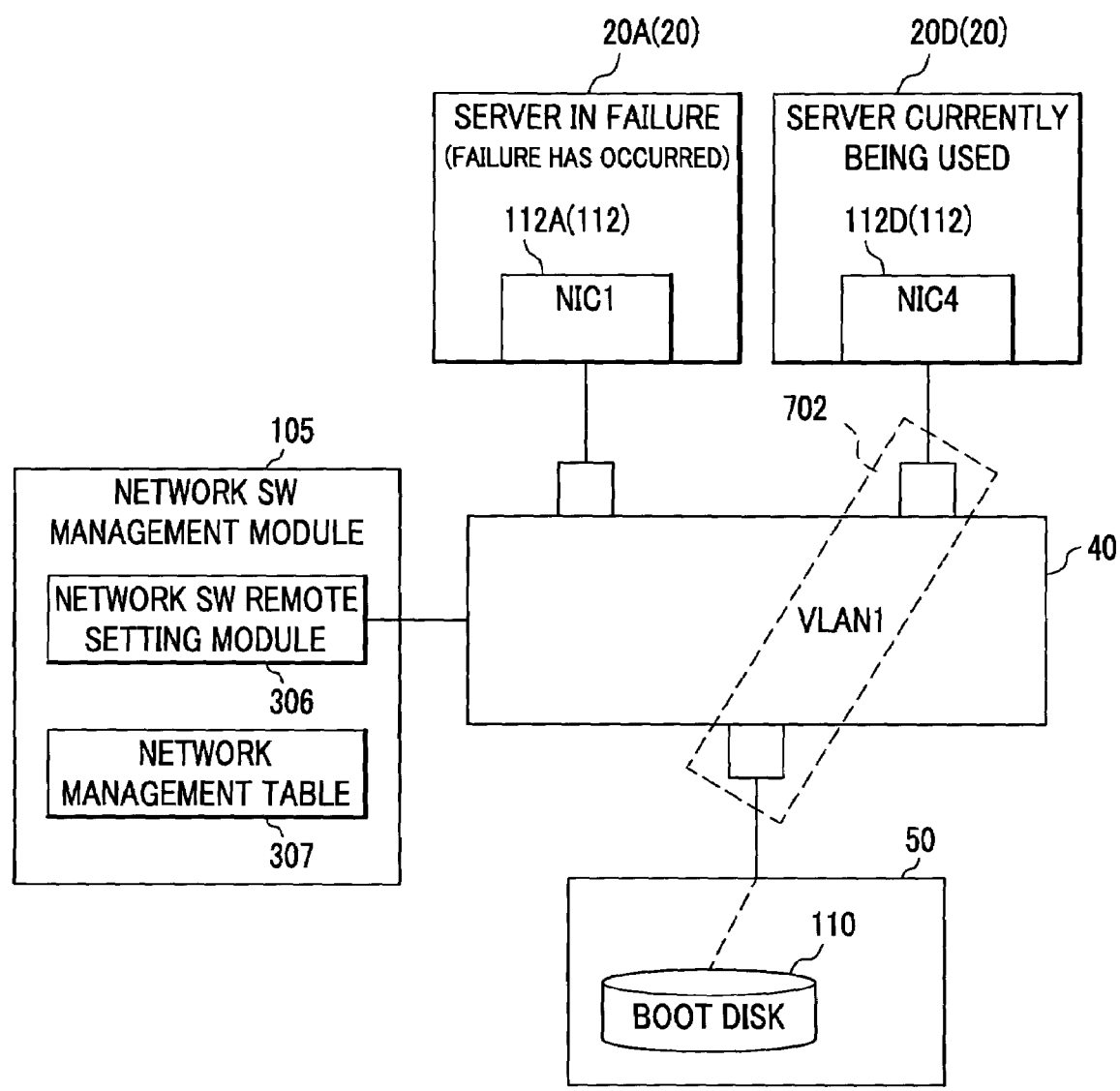
FIG. 12 is a diagram which shows process steps of a recovery process for the server where the failure has occurred.

First of all, referring to FIG. 11, a status of the IP storage network SW 40 and so on before the failure occurs is described. In this status, the server 20A currently being used and a reserve server (another server) 20D are connected to the IP storage network SW 40. In addition, the server 20A currently being used is set to belong to VLAN1. In other words, in the status, the server 20A is possible to access a physical disk drive 110 (, which corresponds to a boot disk,) in the disk array unit 50.

Moreover, the network SW remote setting module 306 included in the network SW management module 105 can change settings of the IP storage network SW 40 by referring to the network management table 307.

Next, referring to FIG. 12, a status of the IP storage network SW 40 and so on after the failure has occurred will be described. Before this status is described, an operation when the failure occurs in the server 20A currently being used is described.

In this case, at first, the BMC 113 (see FIG. 1) in the server 20A sends a notification which indicates a in the server 20A to the boot management module 103 (see FIG. 1) in the management server 10. Then, the server management module 102 (see FIG. 1) in the management server 10 changes contents of the server management table 301 (see FIG. 5). For instance, the failure is stored for the status 407 corresponding to the server identifier (corresponding to Server1) of the server 20A where the failure has occurred.

In addition, the network SW remote setting module 306 disconnects the server 20A where the failure has occurred from VLAN1 and then adds the server 20D to be newly used to VLAN1 referring to the changed server management table 301. For instance, corresponding values are deleted or added for the server identifier 411 and the VLAN ID 414 in the network management table 307.

Accordingly, only the server 20D connected to VLAN1 is authorized to access the physical disk drive 110 which is to be used as the boot disk. As a result, security is assured even when the server 20A is switched to the server 20D.

By the way, after that, the server 20D is network booted so as to be available as a server currently being used.

Figure 13:
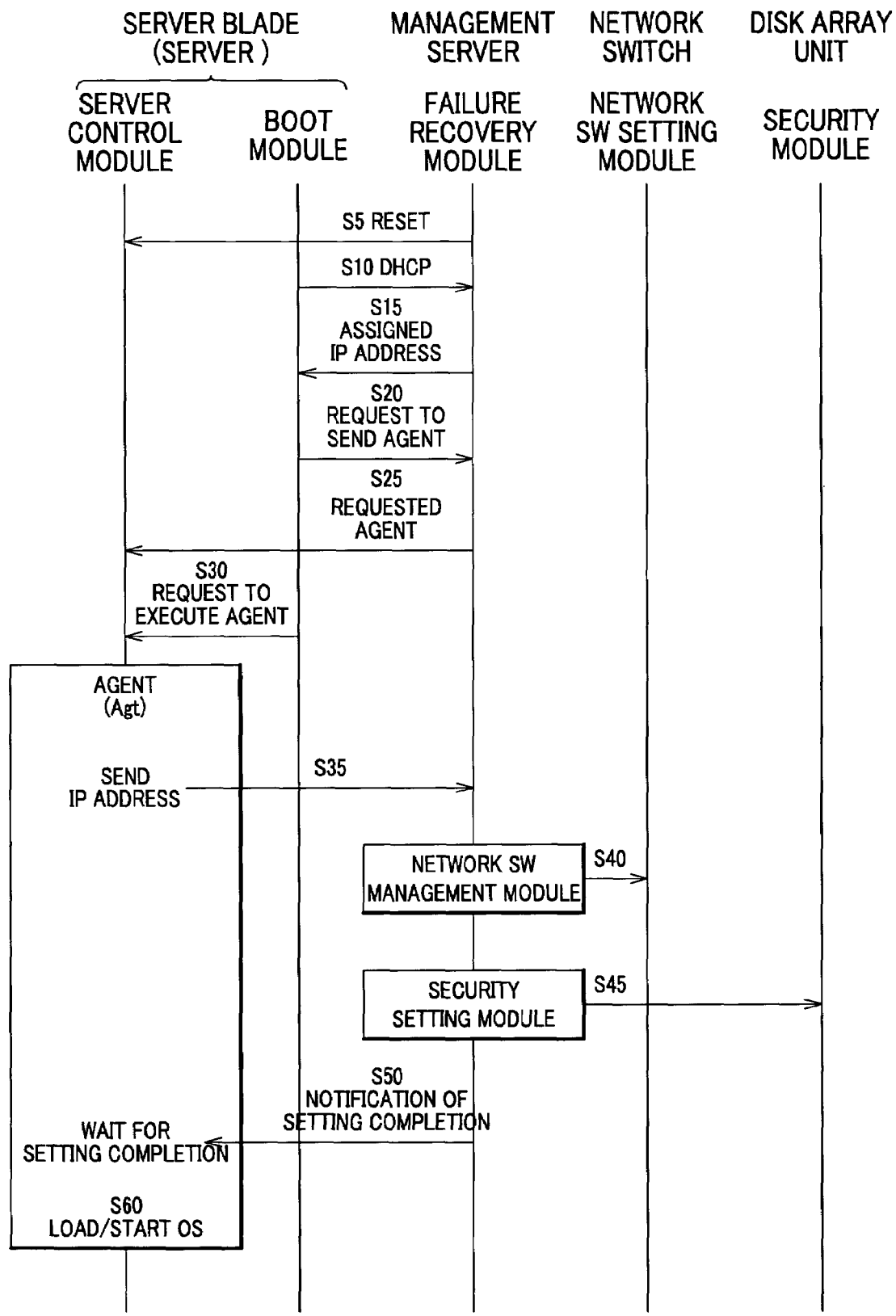
FIG. 13 is a diagram which shows process steps of the recovery process for the server where the failure has occurred.

Next, referring to FIG. 13, process steps concerning to a recovery process of a server where a failure has occurred will be described.

In a step S5, the management server 10 obtains an IP address of a server blade (also referred as the server 20) where the failure has occurred to detect the failure in the server blade. Then, in the management server 10, the failure recovery module 302 sends a reset instruction to the server blade where the failure has occurred. The server blade, which is implemented in a circuit board as a unit, includes a plurality of CPUs operating under management of a single OS. The server may be a server blade or a standalone server.

In a step S10, the server control module 203 (see FIG. 2) in a retrieved reserve server blade resets and starts booting itself in accordance with an instruction from the failure recovery module 302. Then, the boot module 206 (see FIG. 2) in the NIC 112 sends a DHCP request to the management server 10.

In a step S15, the DHCP/TFTP server 106 in the management server 10 assigns an IP address to the server blade which has sent the request. The assigned IP address is sent to the boot module 206 in the NIC 112 in the server blade.

In a step S20, the boot module 206 in the server blade requests the failure recovery module 302 in the management server 10 to send an Agt (, which means an agent hereafter,) 204. For instance, this request may be achieved by giving a DHCP option in order to call a function for a boot image transfer of PXE.

In a step S25, in response to the request, the failure recovery module 302 in the management server 10 sends the Agt 204 to the server control module 203 in the server blade.

In a step S30, the boot module 206 in the server blade requests the server control module 203 to execute the Agt204.

In a step S35, when the execution request is received, the Agt 204 sends the IP address of the NIC 112 to the failure recovery module 302 (see FIG. 3) in the management server 10.

Figure 14:
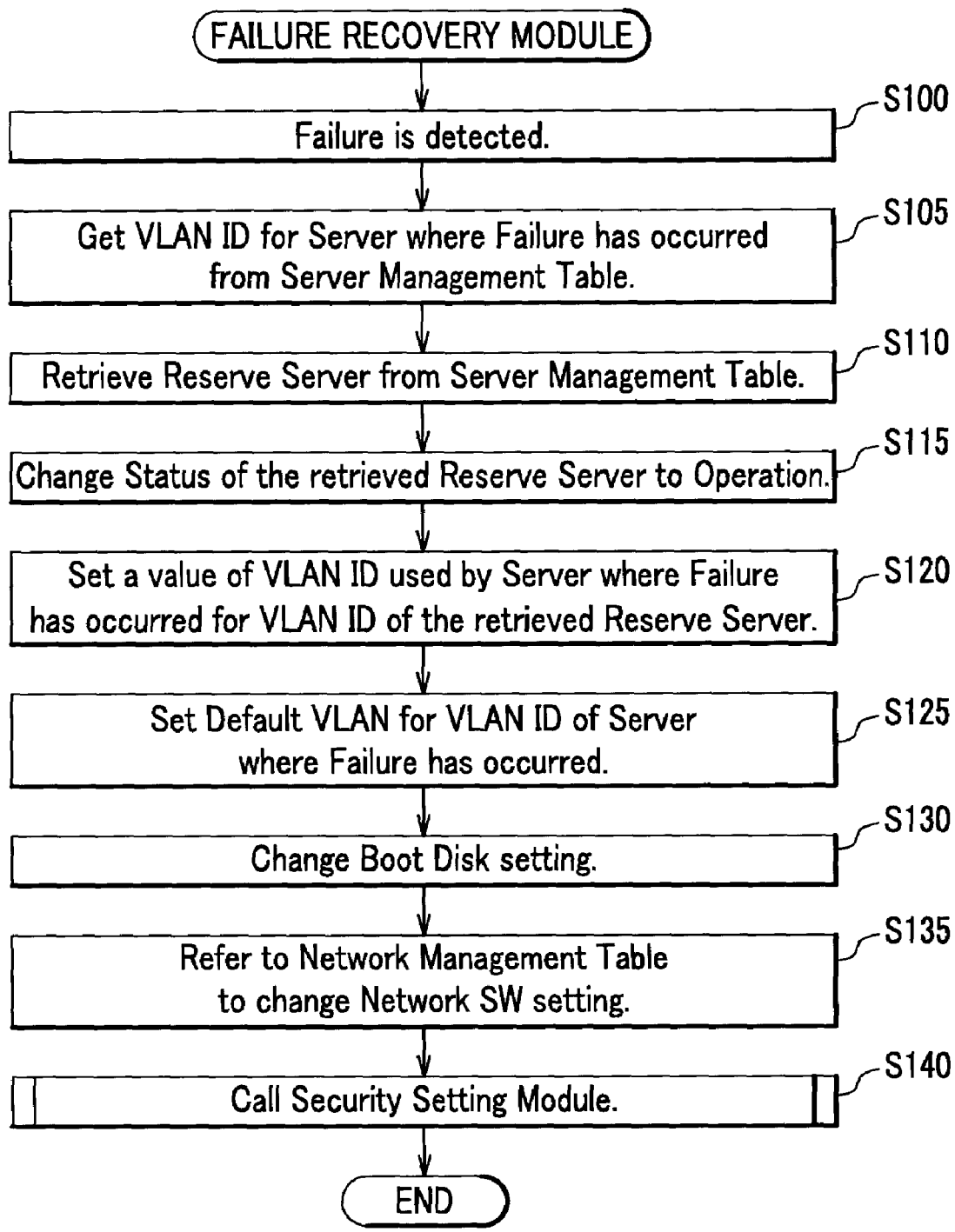
FIG. 14 is a diagram which shows process steps of a failure recovery module.

In a step S40, the failure recovery module 302 in the management server 10 sends a setting instruction to the IP storage network SW 40 (see FIG. 14 for details). In a step S45, the security setting module 104 in the management server 10 sends a setting instruction for access controls to the security module 116 in the disk array unit 50 (see FIG. 15 for details).

In a step S50, when the above-mentioned settings have been completed, the failure recovery module 302 in the management server 10 notifies a setting completion to the Agt 204 in the server blade. By the way, the Agt 204 has been in a waiting status after having sent the IP address in the step S35.

In a step S60, the Agt 204 loads and starts an OS (Operating System) after having received the notification of the setting completion. Thus, the server blade becomes in the status of the operation.

FIG. 14 is a diagram which shows process steps of the failure recovery module.

First of all, the failure recovery module 302 (see FIG. 3) in the management server 10 detects the failure in the server 20 (S100). Then, the failure recovery module 302 obtains the VLAN ID for the server where the failure has occurred from the server management table 301 (S105). Next, the failure recovery module 302 searches the server management table 301 (see FIG. 5) for a reserve server (S110).

In a step S115, the failure recovery module 302 refers to the server management table 301 to change the status of the retrieved reserve server to the operation. Next, the failure recovery module 302 sets a value of the VLAN ID used by the server where the failure has occurred for the VLAN ID of the retrieved reserve server (S120). As a result, the retrieved reserve server becomes possible to be network booted by the same agent 204 with the server 20 where the failure has occurred.

Figure 15:
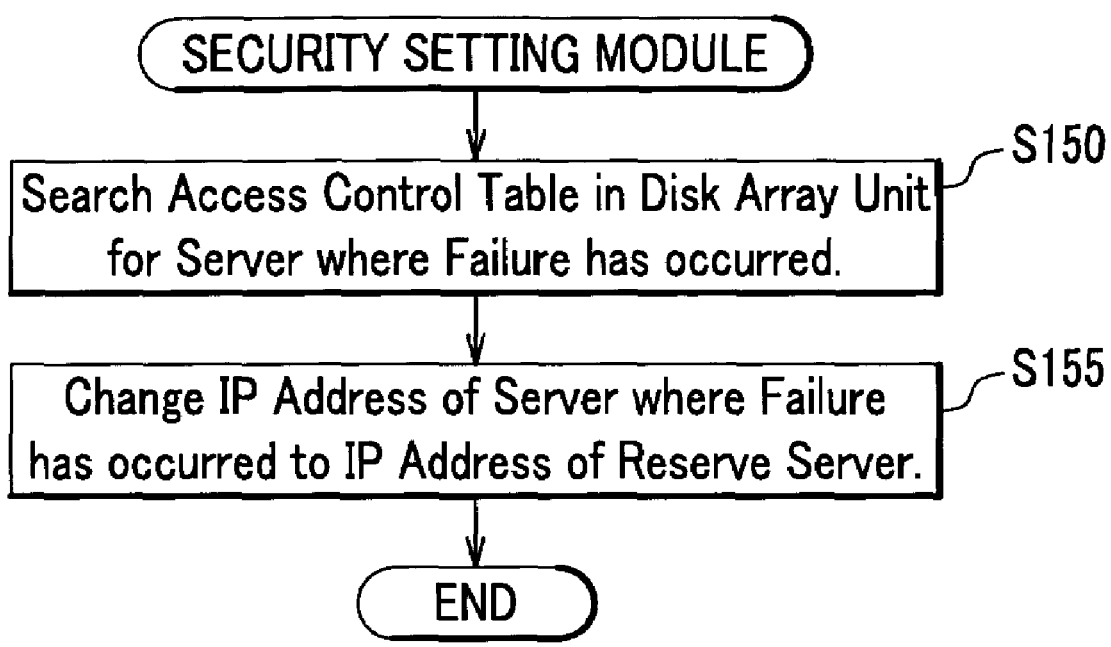
FIG. 15 is a diagram which shows process steps of a security setting module.

In addition, the failure recovery module 302 sets a default VLAN for the VLAN ID of the server where the failure has occurred (S125). Then, the failure recovery module 302 searches the server management table 301 (see FIG. 5) for a correspondence between values for the boot disk of the server where the failure has occurred and the reserve server in order to change the settings of the boot disk (S130). Moreover, the failure recovery module 302 refers to the network management table 307 (see FIG. 6) in order to change the settings of the network SW (S135). To be concrete, corresponding values are set for the VLAN ID. Next, the security setting module 104 is called (S140), and then the process ends. FIG. 15 shows process steps of the called security setting module 104.

FIG. 15 is a diagram which shows process steps of the security setting module. These process steps correspond to the process steps of the step S45 in FIG. 13 and the step S140 in FIG. 14.

The security setting module 104 (see FIG. 4) in the management server 10 obtains the access control table 118 (see FIG. 8) in the disk array unit 50. Then, the security setting module 104 searches the access control table 118 for the server 20 where the failure has occurred (S150). The access control table 118 is searched based on the IP address, which is obtained when the failure is detected, of the server 20 where the failure has occurred. Next, in the access control table 118 (see FIG. 8), the IP address (the value of the server identifier 501) for the server 20 where the failure has occurred is replaced with the IP address for the reserve server, which is sent in the step S35 (see FIG. 13) (S155). Then the process ends. After that, the server 20 where the failure has occurred is disconnected from the network. In addition, the reserve server operates as a substitute server.

Figure 16:
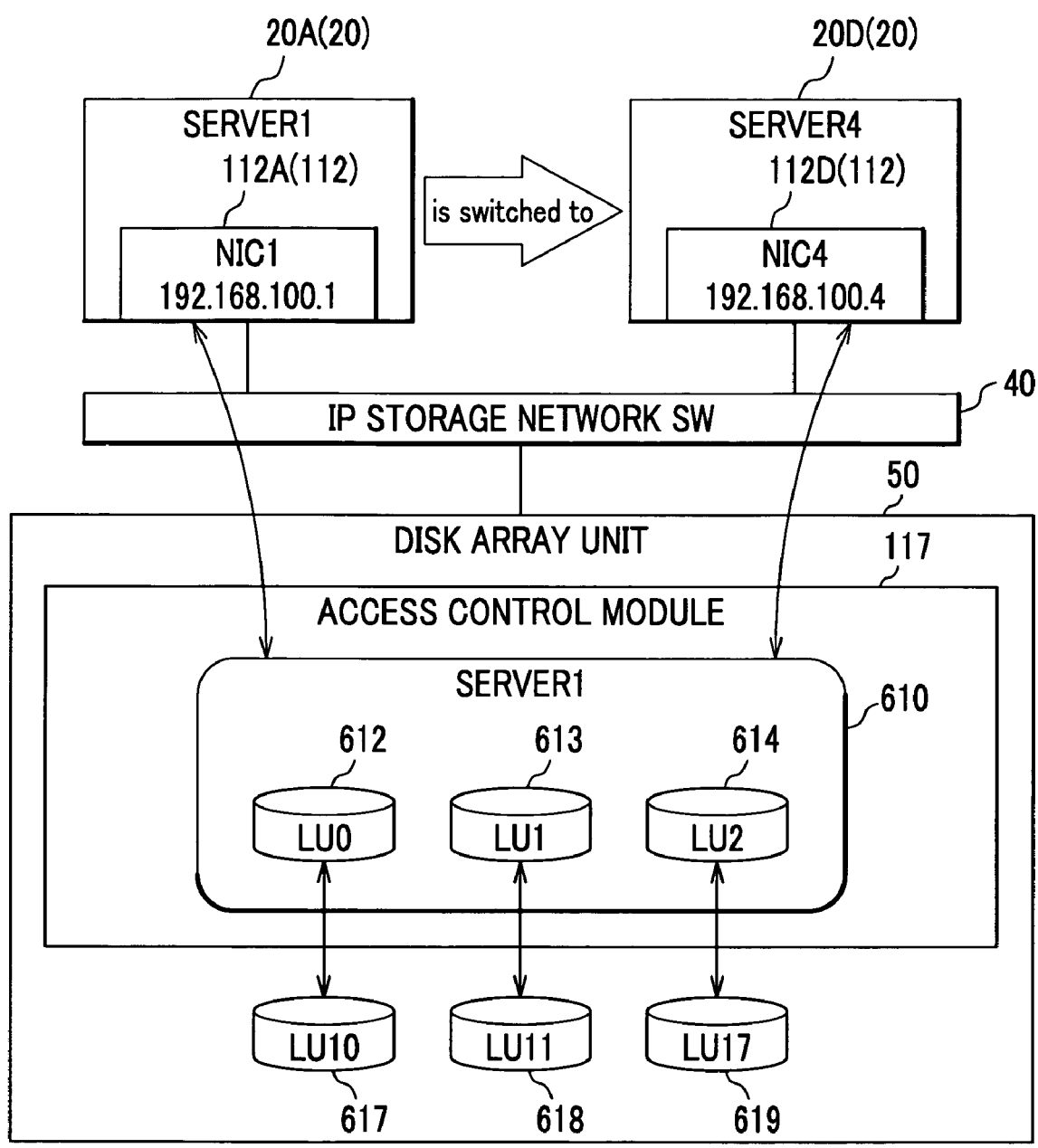
FIG. 16 is a diagram which shows statuses before and after switching the server.

FIG. 16 is a diagram which shows statuses before and after switching the server. Here, the figure shows a case where Server1 is switched to Server4.

Before Server 1 is switched to Server4, Server1 in operation accesses to the virtual disks LU0, LU1, and LU2 through the IP storage network SW 40 while Server 4 cannot access the virtual disks LU0, LU1, and LU2. By the way, accesses to the virtual disks LU0, LU1, and LU2 are respectively converted into accesses to the physical disk drives LU10, LU11, and LU17 by the access control module 117.

Then, after Server1 is switched to Server4, Server4 can access the virtual disks LU0, LU1, and LU2 which Server1 has been accessing through the IP storage network SW 40.

Thus, the server 20 can be securely switched to another server even in the event of the failure in the server 20.

The present invention is not limited to the present embodiment. Hardware configuration, data structure, and process flows in the storage switch system 1 including the management server and so on may vary without departing from the spirit of the present invention. For instance, a router may be employed when the present invention is applied.

Figure 17:
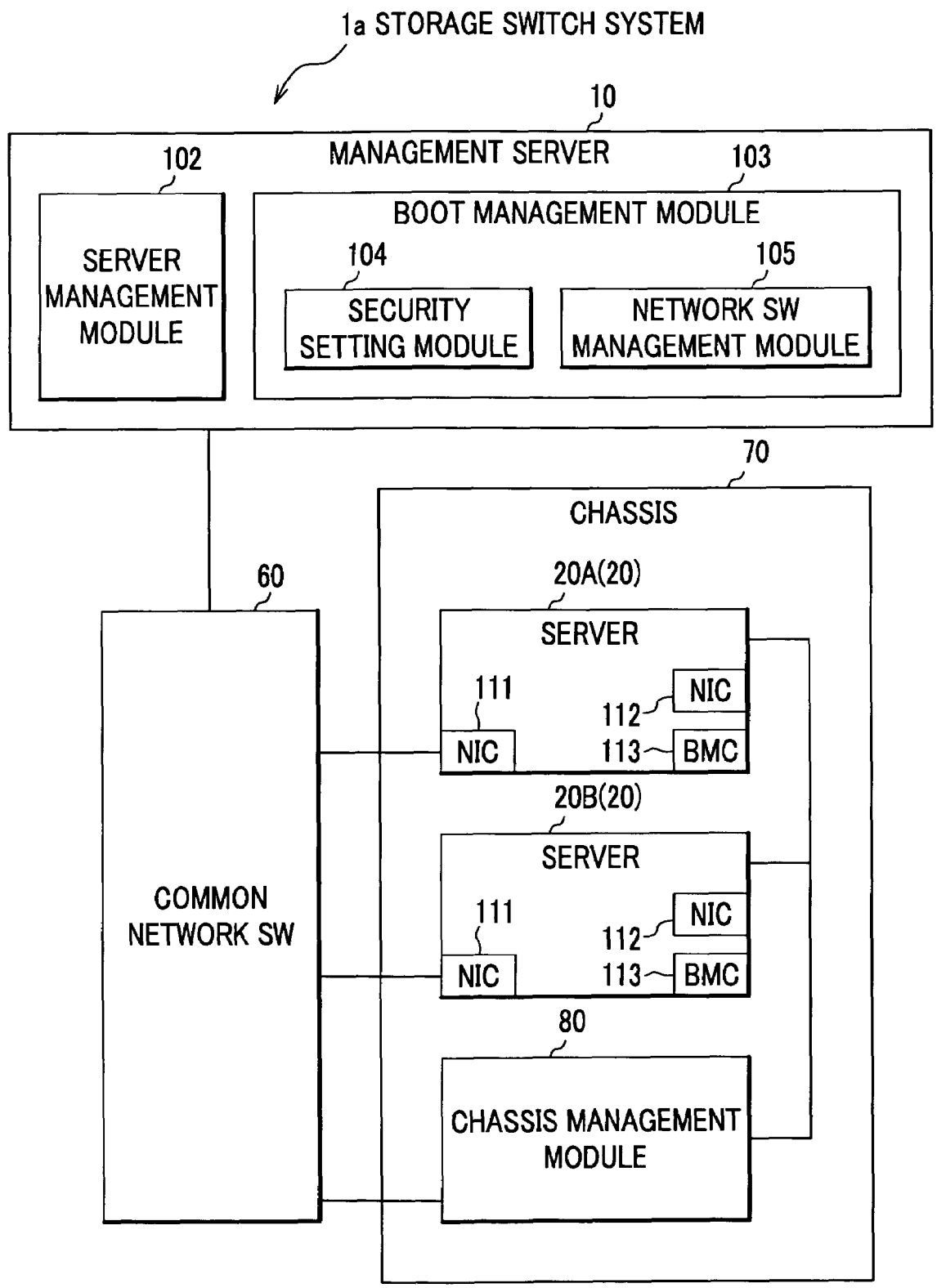
FIG. 17 is a diagram which shows a configuration example of a storage switch system according to another embodiment.

Moreover, in the present embodiment, it has been described that the management server 10 obtains failure information from the BMC 113 in the server 20. However, this is a method to obtain the failure information in a case where the server 20 operates as a standalone server. Accordingly, in another embodiment, there is considered to be a method in a case where the server 20 operates as a blade server. For instance, as shown in a storage switch system 1a (neither the IP storage network SW 40 nor the disk array unit 50 is shown) in FIG. 17, a chassis 70 can communicate with the management server 10 through a common network SW 60. The chassis 70 includes one or more servers 20 and a chassis management module 80. To obtain the failure information, the management server 10 requests the failure information to the chassis management module 80 through the network SW 60. Then, the chassis management module 80 collects the failure information from each of the servers 20 (20A and 20B) in the chassis 70 and then sends the failure information to the management server 10.

In addition, one of methods to obtain the failure information is to obtain the failure information through a server management software (for instance, Watchdog, etc.) which operates on the server 20.

According to the present invention, even in the event of a failure in a computer, the computer can be securely switched.

While the described embodiments represent the preferred forms of the present invention, it is to be distinctly understood that the invention is not limited thereto but may be otherwise variously embodied within the spirit and scope of the following claims.

What is claimed is:

1. A storage switch system including a storage unit, a switch which logically sets a network topology between the storage unit and a plurality of computers, and a management server which communicates with the switch and the storage unit, wherein
    the storage unit comprises one or more disks and a controller which controls accesses to the disks corresponding to each of the computers, wherein
    the management server comprises a memory and a processor, wherein
    the memory holds the network topology which is set by the switch, wherein
    when a failure is detected in one of the computers currently being used, the processor of the management server refers to the memory to change the network topology for the computer where the failure is detected and another computer which substitutes the computer where the failure is detected, and instructs the switch with the changed network topology so as to cause the switch to logically set the changed network topology, and wherein
    the controller of the storage unit controls accesses from the another computer to the disks in accordance with the computer where the failure is detected.

2. A storage switch method to switch a storage unit using a computer system which comprises a storage unit, a switch which logically sets a network topology between the storage unit and a plurality of computers, and a management server which communicates with the switch and the storage unit, wherein
    the storage unit comprises one or more disks and a controller which controls accesses to the disks corresponding to each of the computers, wherein
    the management server comprises a memory and a processor, and wherein
    the memory holds the network topology which is set by the switch, comprising steps of:
    when a failure is detected in one of the computers currently being used, the processor of the management server referring to the memory to change the network topology for the computer where the failure is detected and another computer which substitutes the computer where the failure is detected, and instructing the switch with the changed network topology so as to cause the switch to logically set the changed network topology; and
    the controller of the storage unit controlling accesses from the another computer to the disks corresponding to the computer where the failure is detected.

3. A management program which performs a storage switch method as claimed in claim 2.

4. A management server which communicates with a plurality of computers connected to a storage unit by a network through a switch, wherein
    the management server comprises a memory and a processor, wherein
    the memory holds a network topology which is set by the switch, and wherein
    when a failure is detected in one of the computers currently being used, the processor of the management server refers to the memory to change the network topology for the computer where the failure is detected and another computer which substitutes the computer where the failure is detected, instructs the switch with the changed network topology so as to cause the switch to logically set the changed network topology, and instructs the storage unit to control accesses from the another computer to the disks corresponding to the computer where the failure is detected.

5. A management server as claimed in claim 4, wherein
    the memory further holds current statuses of the computers, and wherein
    the processor refers to the current statuses of the computers in the memory to search for a computer whose current status indicates a reserve as the another computer which substitutes the computer where the failure is detected.

6. A management method used in a management server which communicates with a plurality of computers connected to a storage unit by a network through a switch, wherein
    the management server comprises a memory and a processor, and wherein
    the memory holds a network topology which is set by the switch, comprising steps of:
    when a failure is detected in one of the computers currently being used, the processor of the management server referring to the memory to change the network topology for the computer where the failure is detected and another computer which substitutes the computer where the failure is detected, and instructing the switch with the changed network topology so as to cause the switch to logically set the changed network topology; and
    the processor of the management server instructing the storage unit to control accesses from the another computer to the disks corresponding to the computer where the failure is detected.

7. A management method as claimed in claim 6, further comprising a step wherein
   the memory further holds current statuses of the computers, and wherein
   the processor refers to the current statuses of the computers in the memory to search for a computer whose current status indicates a reserve as the another computer which substitutes the computer where the failure is detected.

8. A management program which performs a management method as claimed in claim 7.

9. A management method as claimed in claim 6, further comprising a step of
   specifying at least identifiers of the computers, an identifier of the switch, and port numbers of the switch, and identifying information of the network for the network topology which is held by the memory.

10. A management method as claimed in claim 9, further comprising a step wherein
    the processor receives an IP address sent from the computer where the failure is detected and the IP address is changed to an IP address which is an identifier of the another computer which substitutes the computer where the failure is detected.

11. A management program which performs a management method as claimed in claim 10.

12. A management program which performs a management method as claimed in claim 9.

13. A management method as claimed in claim 6, further comprising a step of
    using a device which supports VLAN, or a router for the switch.

14. A management program which performs a management method as claimed in claim 13.

15. A management program which performs a management method as claimed in claim 6.

* * * * *